Aug. 30, 1932.　　　　A. G. DECKER　　　　1,874,250
SCREW DRIVER AND WRENCH FRICTION DRIVE
Filed May 24, 1928　　　3 Sheets-Sheet 1

Inventor
Alonzo G. Decker
By Edwin Hammel
Attorney

Witness
Porter H. Hautt

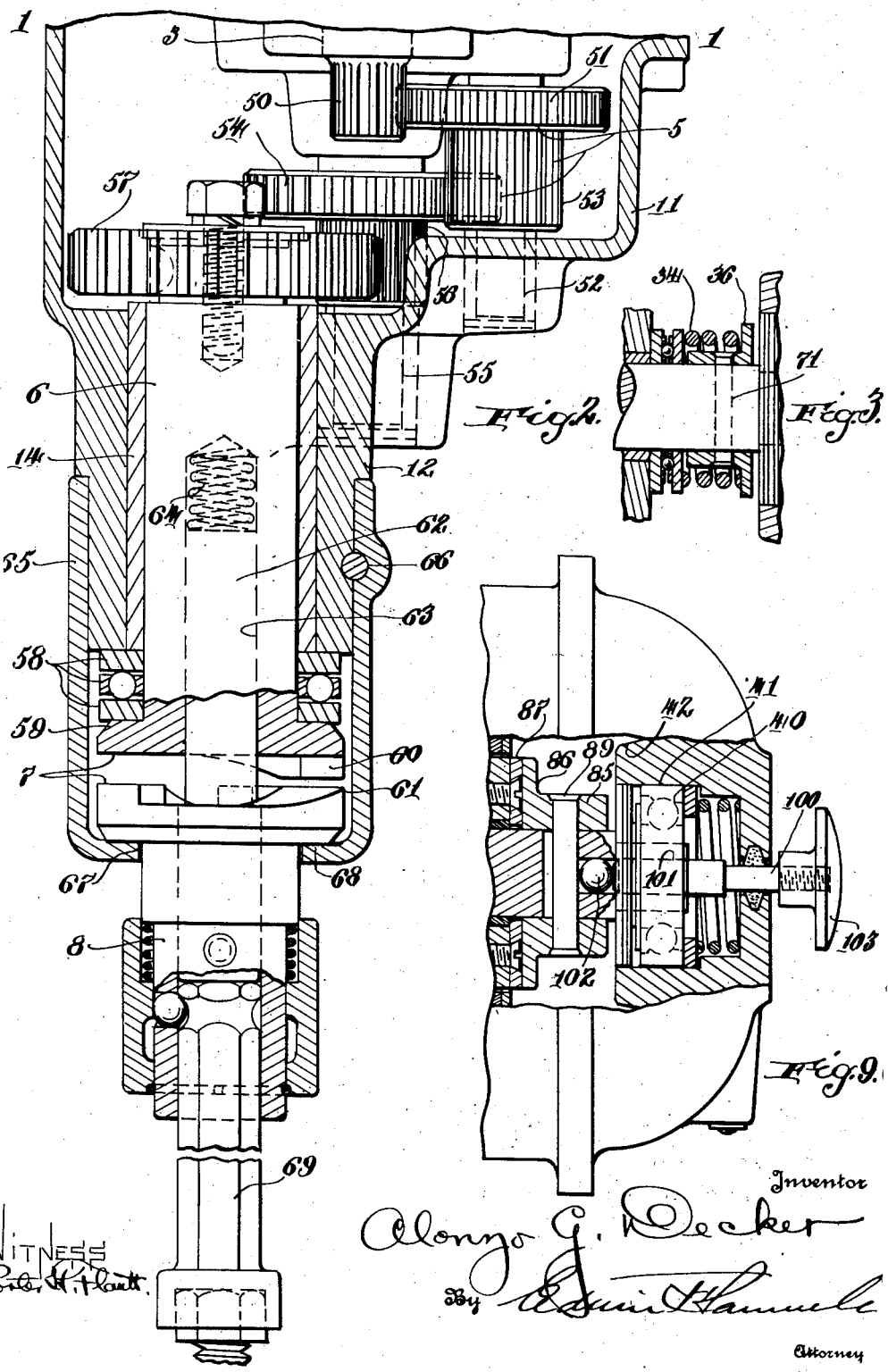

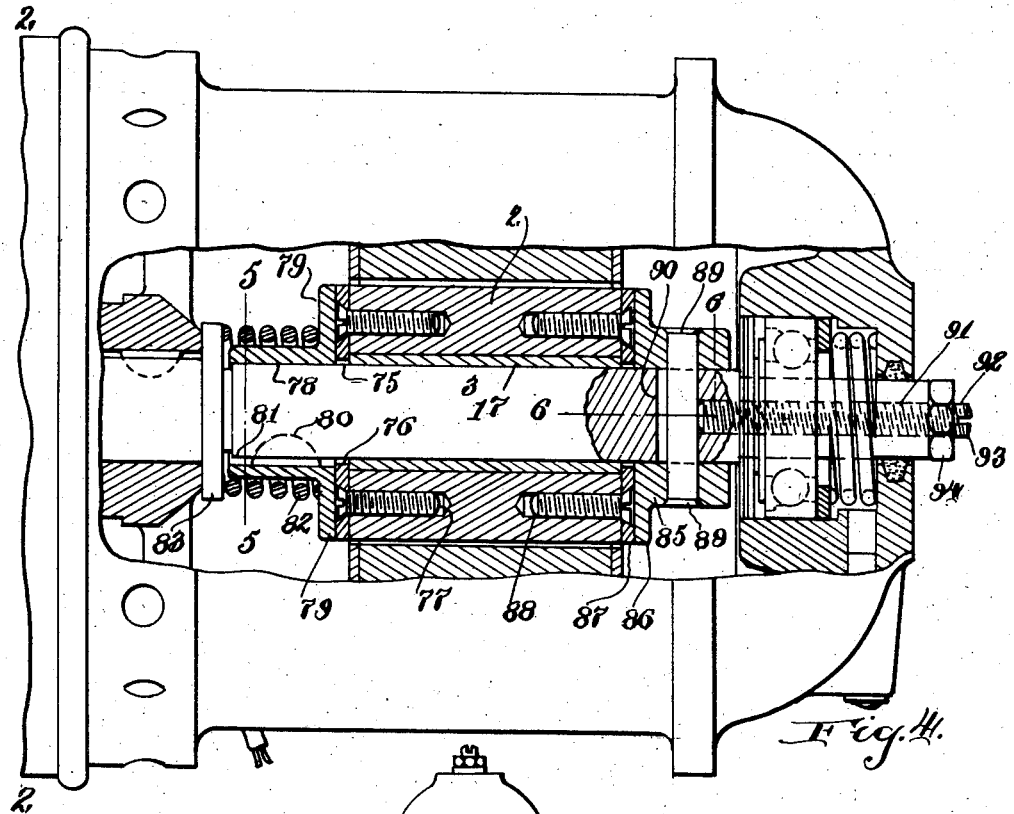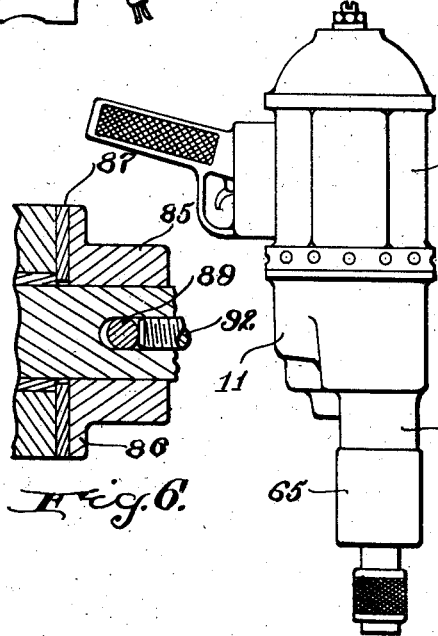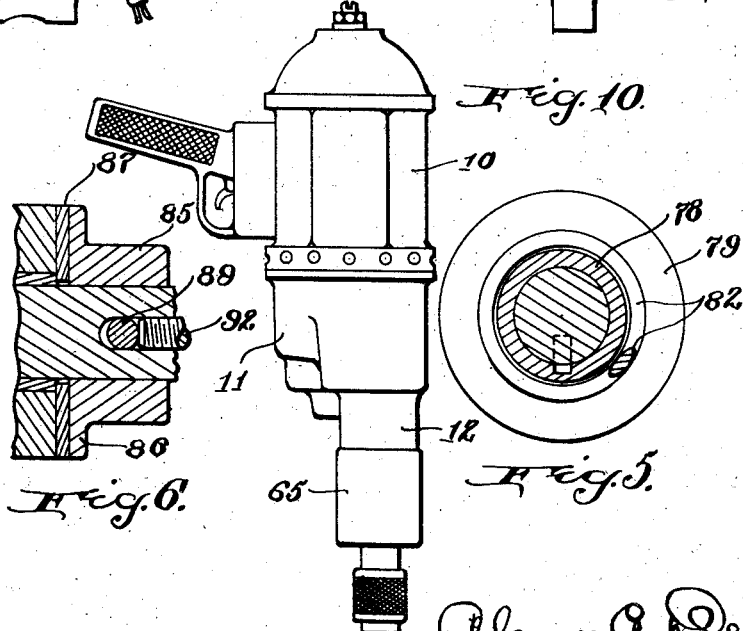

Patented Aug. 30, 1932

1,874,250

UNITED STATES PATENT OFFICE

ALONZO G. DECKER, OF BALTIMORE COUNTY, MARYLAND, ASSIGNOR TO THE BLACK AND DECKER MANUFACTURING COMPANY, OF TOWSON HEIGHTS, MARYLAND, A CORPORATION OF MARYLAND

SCREW DRIVER AND WRENCH FRICTION DRIVE

Application filed May 24, 1928. Serial No. 280,178.

The invention relates to a manually portable, power driven tool of the rotary or drill type and particularly to a tool or type of tool used for screw driving, nut setting, stud setting and for the removal of screws, nuts, studs, and the like. In the operation of such tools the gears, shafts, gear teeth and particularly the keys, are subjected to severe shocks and peak stresses when the driving or setting operation is completed and also at the beginning of the operation of removing the screws, nuts, bolts, studs, and the like.

The present invention relates particularly to means for relieving the shocks or peak stresses referred to by providing a protective yielding or slippage between the parts when subjected to a torque in excess of that predetermined as safe.

In accordance with the present invention, this result is accomplished by means of a friction connection or coupling resembling a disk clutch whereby the rotor is connected to the motor shaft to drive the same.

The preferred form of tool of the general type described comprises, in accordance with the previous practice, a normally released jaw clutch between the spindle and the tool chuck whereby the tool is driven by the spindle, being instantaneously engaged whenever working pressure is applied, and disengaged instantaneously whenever such working pressure is relaxed.

The invention relates broadly to the screw, nut and stud setting machine with the friction clutch or coupling and to this feature in combination with the jaw clutch described.

In the accompanying drawings I have illustrated so much of a portable electric tool as is necessary to a full understanding of the nature and operation of the invention, the latter being shown in several different forms.

In the drawings:

Figure 2 is a section on the same plane through the gear casing and spindle showing the gears, spindle and jaw clutch. The broken line 1—1 at the upper end of Figure 2 is substantially identical with the broken line 2—2 at the left in Figure 1.

Figure 3 is a fragmentary section in the plane of Figure 1 showing the spring tension in a modified form.

Figure 4 is an elevation of the motor housing broken away to show the rotor, etc., in section on the plane of Figure 1, and the motor shaft, coupling, etc., in a further modified form.

Figure 5 is a section at right angles to Figure 4 taken on the line 5—5 of Figure 4.

Figure 6 is a fragmentary longitudinal axial section through the motor shaft, the same being taken on the line 6—6 of Figure 4 at right angles to the plane of Figure 4.

Figure 9 is a fragmentary section corresponding to Figure 4 and showing a modified arrangement applying to the mechanism at the extreme right hand portion of said figure.

Figure 10 is an assembly of the entire machine or tool on a small scale.

Figure 1:
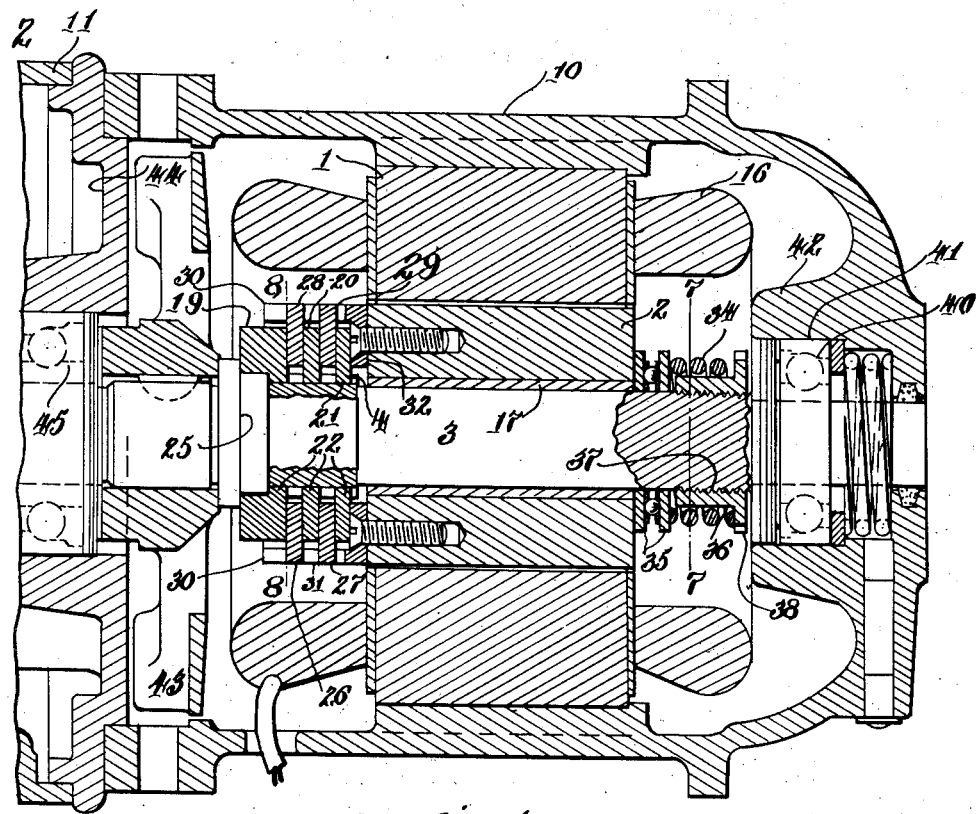
Figure 1 is a longitudinal axial section through the motor, motor housing, etc., showing the rotor and coupling or clutch in central section.

Referring to the drawings by numerals, each of which is used to indicate the same or similar parts in the different figures, the machine, as shown in Figures 1, 2, 7 and 8 comprises an electric motor 1 having a rotor 2 connected to the motor shaft 3 by means of a friction coupling or clutch 4, the shaft 3 being connected by means of reducing gearing 5 to the spindle 6 to operate the same, the spindle being in the preferred form of the machine connected at intervals by means of the normally released jaw clutch 7 to the chuck 8. More particularly described, the motor 1 is enclosed within a motor housing 10 to which is secured the gear casing 11 containing the reducing gears 5 and having an extension 12 supporting and enclosing an elongated bearing 14 for the spindle 6. The motor 1 comprises a stator or field 16 secured to the housing 10 and the rotor 2, which is mounted on the motor shaft 3, the rotor being preferably provided with a bronze bushing 17 surrounding the shaft. This is a well known commercial structure to which the invention is applied for purposes of illustration.

An important feature of the invention resides in the friction member 4 shown in the form of a friction coupling or clutch, providing a yielding connection between the rotor 2 and the motor shaft 3, and in the manner of locating and applying the same.

In the preferred form illustrated in Figure 1 the clutch or coupling mechanism 4 consists of a series of disks or friction plates 19, 20 and 21 which are mounted on the motor shaft 3 and connected thereto by means of tongues or keys 22, which engage and slide in the keyways or slots 24 in the shaft 3, it being understood that the outer plate 19 bears against an abutment or shoulder 25. The plates 20 and 21, as shown, are slidable and spaced apart. These plates being referred to as driven plates, the driving friction plates 26 and 27 are the spacing means located in the respective spaces between the driven plates 19, 20, 21.

These driving plates 26 and 27 are provided with projecting tongues 28 and 29 which extend outward radially from their peripheries, entering and engaging longitudinal slots 30 parallel to the axis and formed in or between the projecting portions 31 of the plate 32, known as a back plate, secured to the adjacent end of the rotor 2.

Pressure is set up between the driven disks 19, 20 and 21, slidably connected to the shaft 3, and the driving disks 26 and 27 similarly connected to the rotor in any suitable manner as by means of a helical spring 34.

In the form of the invention shown there is a thrust bearing 35 surrounding the shaft 3 engaged on one side by the spring 34, the pressure of which is applied by the bearing to the rotor 2 on the side opposite from the clutch or coupling member 4. The spring, as shown, is mounted on a collar or sleeve 36 which is shown in Figure 1 as threaded internally at 37 to engage a corresponding thread on the shaft by which the collar may be adjusted longitudinally of the shaft to vary the spring pressure. This sleeve 36 is flanged at one end at 38 opposite to the rotor and the thrust bearing 35 providing an abutment for the spring opposed to the thrust bearing.

Figure 7:
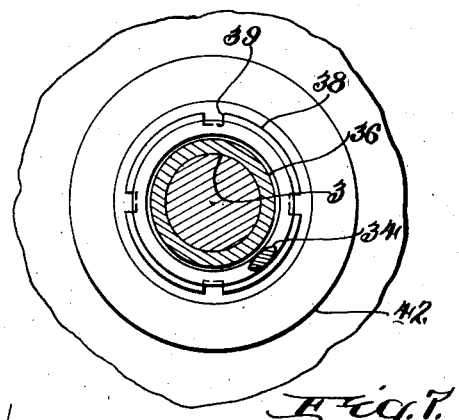
Figure 7 is a section on the line 7—7 of Figure 1.
Figure 8:
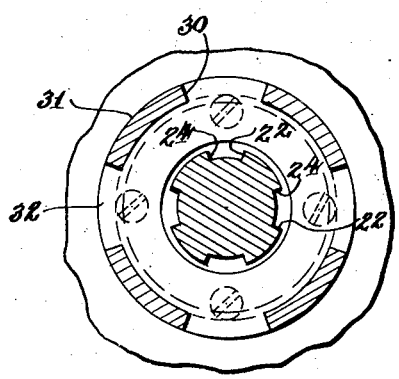
Figure 8 is a section on the line 8—8 of Figure 1.

The drawings, Figure 7, show the flange 38 notched at 39 at suitable intervals along its periphery to engage a spanner or other tool to adjust the collar or sleeve 36 to the desired position.

The extreme end of the motor shaft 3, in the form of the invention shown, is mounted in a spring take-up bearing 40 enclosed within a bearing cup 41 formed in an internal boss 42 in the casing 10. At the opposite end is shown a fan 43 mounted on the motor shaft and separated from the gear casing by a bearing support 44 carrying the motor shaft bearing 45, the bearing support being inserted between the motor housing 10 and the gear casing 11.

In Figure 2 I have shown the reducing train 5 connecting the motor shaft 3 to the spindle 6, also the normally disengaged jaw clutch 7 connecting the spindle to the chuck 8.

The reducing train 5 comprises a pinion 50 on the motor shaft 3, a gear 51 mounted on a suitable stud 52 in the casing and carrying a second pinion 53 concentric with the gear 51 and secured to the latter. This pinion 53 meshes with a gear 54 mounted on a second stud 55 seated in the casing, which gear 54 carries a concentric therewith a pinion 56 which meshes with a gear 57 secured to the spindle 6.

The spindle, as already described rotates in an elongated bearing in the form of a bushing 14 mounted in the extension 12 of the gear casing previously referred to. At the lower end of the bushing and extension is a ball thrust bearing 58 between the adjacent ends of the bushing 14 and the extension 12 on one side and a shoulder 59 on the spindle 6 on the other side. The lower end of the spindle where it is enlarged for the formation of the shoulder 59 is provided with depending jaw clutch teeth 60 and the upper end of the chuck 8, likewise enlarged to cause the teeth to register, is provided with cooperating jaw clutch teeth 61, it being understood that the details are not material to the invention.

The chuck is formed with a central upwardly projecting stud 62 which occupies a central axial bore 63 in the spindle and in the upper portion of the bore 63 between the upper end of the stud 62 and the end of the bore is a helical spring 64 which imparts a downward tendency to the chuck member and the lower set of clutch teeth 61.

The motion of the chuck member 8 with the teeth 61 is limited and the chuck member is held in position on the spindle when the teeth 60 and 61 are disengaged by means of a cup 65 enclosing and secured to the extension 12 of the casing, by means of a pin 66, or in any suitable manner. The cup is bored at the lower end at 67 to pass the chuck and the latter is enlarged and shouldered at its upper end at 68 to provide for the teeth 61 and this shoulder 68 rests on the bottom of the cup surrounding the opening 67. It should be understood that this is a commercial structure, the details not being essential to this invention.

In operation, a suitable bit 69 being inserted in the chuck 8, the bit is engaged with the work and the entire tool is pressed downwardly against the work, overcoming the pressure of the spring 64 which holds the clutch normally out of engagement so that the jaws 60, 61 are caused to intermesh.

When the screw or nut bolt or stud is turned down to final position, a resistance is encountered due to the torque of the motor and the momentum of the parts and the resistance of the work which might be injurious to the gear teeth or cause shearing of the keys or other disastrous results.

By means of the construction described the difficulty is overcome and the parts of the machine thus put under peak stress are protected by the friction member 4, which relieves the parts of the torque of the motor. The momentum of the parts when relieved of the torque of the motor to this extent is ordinarily insufficient to cause any trouble.

The placing of the friction clutch in this position further makes it possible to utilize the momentum of the parts below the rotor and, to the extent of the friction, the momentum and torque of the motor in applying to the work a series of tangential blows by causing the jaw clutch to disengage and engage at short intervals.

The construction shown may be modified as to the flanged sleeve 36 and the manner of securing the same by substituting a pin 71 for the threads 37 as a holding means for the sleeve, see Figure 3. In this construction, however, the adjustment of the spring tension by moving the sleeve is dispensed with, the parts being set for slippage at a definite torque.

A still further modification of the entire friction member is illustrated in Figures 4, 5 and 6. In this construction the shaft 3 is connected to the rotor 2 by means of a friction coupling or clutch 75 which, in the form of the invention shown in this figure, comprises a friction plate or disk 76 secured to the end of the rotor 2 surrounding the shaft 3, the securing means, in the form shown, consisting of screws 77. The clutch or coupling also includes a flanged collar or sleeve 78 mounted on the shaft to slide thereon immediately adjacent the disk 76, the flange 79 of the said sleeve or collar presenting a frictional engaging surface to the disk 76. The collar 78 is connected to the shaft 3 by means of a key 80 seated in the shaft and engaging a longitudinal slot 81 on the inside of the collar. The flange 79 is held with a yielding pressure against the disk 76 by means of a helical or coil spring 82 which encircles the collar between the flange 79 thereon and a flange or collar 83 on the shaft.

In this construction the tension of the spring is regulated by moving the rotor to a slight degree in the direction of the axis. Instead of the thrust bearing 35, flanged sleeve 36 and spring 34, Figure 1, the drawings Figure 4 show a flanged collar 85 on the shaft 3 and likewise on the side of the rotor opposite the spring 82.

The flange 86 of the collar bears against a friction plate 87 similar to the plate 76 and secured to the rotor by means of screws 88 or in any suitable manner. This collar 85 is secured to the shaft by means of a pin 89, which extends through the shaft diametrically, occupying a slot 90 in the shaft and providing for a motion longitudinally of the shaft, on the part of the flanged collar 85 and the pin.

It will be understood that the pressure of the spring 82 being transmitted to the rotor 2 by way of the flange 79 of sleeve 80 to the plate 76 on the rotor and hence from the rotor by way of the plate or disk 87 to the flange 86 of the collar 85, the frictional transmission of torque by the rotor to the shaft is effected at both ends of the rotor, through all four of the plates or flanges 76, 87, and 79, 86.

In this instance an adjustment of the spring tension is obtained by moving the collar 85 and the parts to the left of it, including the rotor 2 and plate 76 and collar 78 to the left against the spring tension, or permitting it to move to the right to relieve the spring tension. In the form of the invention shown, the end portion of the shaft 3 to the right beyond the pin 89 is bored in the direction of the axis at 91 and threaded to receive an adjusting screw or bolt 92 which is slotted at the end at the right at 93, or otherwise provided with means whereby the screw is turned to obtain the desired adjustment.

The screw, as shown, is also provided with a lock nut 94 to hold it in adjusted position. This screw bears at the end opposite the slot, i. e., at the left against the pin 89, which pin being rigidly seated in the collar 85 and located in a longitudinal slot 90 in the shaft, when it receives the pressure of the screw 92, moves the collar 85 and hence the rotor 2 and the collar 79 to the left against the pressure of the spring 82, or the screw may be withdrawn, relieving the spring of part of its tension, which is thereby regulated to give the desired adjustment of the friction or torque at which the clutch or coupling yields.

Figure 9 illustrates still another modification of the adjusting means for determining the torque of the coupling, i. e., the degree of frictional engagement between the clutch members. In this instance a pin 100 has been substituted for the adjusting screw 92, Figures 4 and 6. This pin, in the form of the invention shown, is mounted in a bore 101 in the end of the shaft 3 and engages at its inner end a ball 102 also in the bore 101, which ball bears against the pin 89. In this instance the normal tension of the spring 82 is slightly less than is required for the operation of the tool, or at least for the most efficient operation of the tool, during the periods of peak stress, and to obtain the desired engagement of the clutch to give the necessary torque at the tool or bit 69 pressure is applied by the hand of the operator to the pin 100 by way of the button 103, shown on the end or in any other suitable manner, the object being to increase the pressure with which the clutch is engaged and give the desired working torque or rotary momentum.

The operation of the various modifications of the invention have been fully explained in connection with the description of the structure.

I have thus described specifically and in detail several embodiments of my invention in order that the nature and operation of the same may be clearly understood, however, the specific terms herein are descriptively used rather than in a limiting sense, the scope of the invention being defined in the claims.

What I claim as new and desire to secure by Letters Patent is:

1. Driving means for a portable power driven screw driver and wrench having a spindle with a normally released jaw clutch comprising a motor, a motor shaft having a rotor mounted thereon to rotate relatively thereto, clutch plates keyed to the shaft to slide relatively thereto, and rotate therewith, corresponding clutch plates secured to the rotor to rotate therewith and slide relatively thereto in the direction of the axis of the shaft, and means imparting to the rotor a tendency to move in the direction of said clutch plates whereby the clutch plates are placed in frictional engagement imparting a yielding rotary tendency to said shaft.

2. Driving means for a portable power driven screw driver or wrench having a spindle with a normally released jaw clutch comprising a motor, a motor shaft having a rotor mounted thereon to rotate relatively thereto, clutch plates keyed to the shaft to slide relatively thereto, and rotate therewith corresponding clutch plates secured to the rotor to rotate therewith and slide relatively thereto in the direction of the axis of the shaft, and means imparting to the rotor a tendency to move in the direction of said clutch plates whereby the clutch plates are placed in frictional engagement imparting a yielding rotary tendency to said shaft, said latter means comprising an antifriction collar and a spring encircling the shaft and bearing against said collar.

3. Driving means for a portable power driven rotary tool having a spindle and shaft with a normally released jaw clutch, the same comprising a motor shaft, a rotor mounted thereon to rotate relatively thereto and clutch plates spaced apart and keyed to the shaft to rotate therewith and slide thereon, clutch plates interspaced between said first mentioned clutch plates, the rotor having projecting portions slotted in the direction of the axis, the second mentioned clutch plates being engaged by said projecting portions which are thereby caused to rotate with the rotor means for holding the clutch plates in frictional contact.

4. Means for driving a portable power driven screw driver and wrench having a spindle with a normally released jaw clutch comprising a motor and a shaft, a rotor rotatively mounted on the shaft and adapted to slide relatively thereto, a friction clutch member mounted on the shaft, a cooperating clutch member on the rotor, a spring tending to slide the rotor along the shaft and hold said clutch members in engagement and manually operated means for controlling the engagement of the friction clutch member.

5. A drive for a portable power driven screw driver or wrench having a spindle with a normally released jaw clutch comprising a motor having a motor shaft, a rotor mounted to rotate on said shaft, a friction clutch member secured to the shaft to slide relatively thereto, a friction clutch member secured to the rotor and a spring tending to hold said frictional clutch members in frictional engagement with each other.

Signed by me at Towson, Maryland, this 19th day of May, 1928.

ALONZO G. DECKER.